# United States Patent Office 3,175,948
Patented Mar. 30, 1965

3,175,948
MULTIVITAMIN TABLETS AND PREMIXES
Arnold Koff, West Orange, and Louis Magid, Clifton, N.J., assignors to Hoffmann-La Roche Inc., Nutley, N.J., a corporation of New Jersey
No Drawing. Filed Jan. 10, 1963, Ser. No. 250,493
4 Claims. (Cl. 167—81)

The present invention relates to multivitamin tablet premixes, to multivitamin tablets prepared therefrom, and to processes for their preparation.

Multivitamin tablet premixes containing one or more vitamins in admixture with pharmaceutical excipients are known to the art. These premixes are useful for mixing with other vitamins and excipients to form multivitamin tablets. However, heretofore, prior art premixes, when mixed with other ingredients prior to tableting, tended to exhibit a settling out of one or more ingredientst so that the composition of the tablets prepared therefrom varied over relatively wide ranges. This inconsistency in composition of multivitamin tablets is, of course, highly undesirable.

It has now been found that tablets prepared from the premixes of the instant invention, by mixing the premixes with other ingredients such as vitamins and lubricants, and then compressing the resulting mixture into multivitamin tablets, exhibit unusually consistent tablet compositions. Additionally, the novel premixes of the invention are highly stable, and can therefore be prepared in large quantities, stored for long periods of time, and then used as required.

The premixes of the invention contain, as essential ingredients, from about 5 to about 20 percent, preferably about 10 to about 18 percent of niacinamide; from about 15 to about 55 percent, preferably about 20 to about 40 percent (based on the ascorbic acid value) of ascorbic acid or sodium ascorbate or a mixtuure of ascorbic acid and sodium ascorbate in any proportion; from about 20 to about 80 percent dicalcium phosphate (based on the anhydrous dicalcium phosphate value), which can be employed as the anhydrous or dihydrate form; and from about 0.5 to about 25 percent, preferably about 0.5 to about 10 percent of cornstarch. The above percentages are percentages by weight based on the total weight of premix. While it is preferred to employ a premix containing only the above ingredients, small quantities of other vitamins such as vitamin $B_2$ and vitamin $B_6$ can also be included. It is preferred, however, to add these additional vitamins at the time the premix is mixed with the other ingredients employed to form a composition suitable for compression into multivitamin tablets.

The premixes of the invention are prepared by mixing together the above quantities of niacinamide, ascorbic acid (or sodium ascorbate or mixtures thereof), dicalcium phosphate, and cornstarch with from 150 to 400 percent by weight of water and then spray-drying to form a free-flowing powder. Alternatively, the above ingredients can be mixed with from 10 to 20 percent of water to form granules which are then dried and ground. The granules and spray-dried premixes have an average particle size in the range of about 200 mesh to about 20 mesh.

The premixes of the invention are then mixed, when desired, with added vitamins and lubricants, and compressed into tablets. It has been found that in order to obtain good quality tablets of uniform composition, the premix must be employed in a quantity ranging from about 127 mg. to about 200 mg., preferably about 175 mg. to about 195 mg., with from about 20 mg. to about 40 mg. total of the added vitamins and lubricants per tablet. Hence, in order to obtain the advantages of the instant invention in the final tablet, both the composition of the premix, and the amount of premix employed in the final tablet in relation to the added vitamins and lubricant(s) is important.

The added ingredients mixed with the premix to form the multivitamin tablets of the invention are from about 2 to about 20 mg. of a stabilized pharmaceutical powder having a vitamin A potency of about 500,000 units/gram; from about 1 to about 5 mg. of vitamin $B_1$; from about 1 to about 5 mg. of vitamin $B_2$; from about 1 to about 5 mg. of vitamin $B_6$; from about 0.2 to about 1.5 mg. of a stabilized pharmaceutical powder having a vitamin $D_2$ potency of about 850,000 units/gram; from about 0.5 to about 5 mcg. of vitamin $B_{12}$; from about 0.5 to about 10 mg. of pantothenic acid (or an equivalent such as calcium pantothenate, panthenol, calcium pantothenate-calcium chloride complex, dl-panthenol, etc.); and from about 0.5 to about 15 mg. of one or more pharmaceutical tableting lubricants such as calcium stearate, stearic acid, cornstarch, magnesium stearate, talc, hydrogenated vegetable oils (e.g., Sterotex), etc. With respect to vitamins A and $D_2$ the potency of the powders employed can vary from the unit quantities given above, e.g., within the range of about 250,000 to about 600,000 units/gram for vitamin A powder and from about 500,000 to about 1,000,000 units/gram for vitamin $D_2$ powder, and where there is a variation from the 500,000 units/gram for vitamin A and 850,000 units/gram for vitamin $D_2$, the quantity of powder employed is chosen so that the number of units is equivalent to that of the ranges given above, e.g., equivalent to from about 2 to about 20 mg. of vitamin A powder of a potency of about 500,000 units/gram, and about 0.2 to about 1.5 of a vitamin $D_2$ powder of a potency of about 850,000 units/gram, and conforms to the requirement that the total quantities of the above added ingredients falls within the range of about 20 to about 40 mg. per tablet.

The vitamin A and $D_2$ stabilized pharmaceutical powders are those commonly employed in the multivitamin tableting art, such as vitamin A palmitate or Vitamin A acetate powder. Also, a single stabilized powder can be employed which contains both vitamins A and $D_2$. The mixture of the premix plus the added vitamins and lubricant(s), optionally with small quantities of other ingredients such as binders, e.g., from about 0.5 to about 30 mg. of a binder per tablet such as polyvinylpyrollidone, gum acacia, pregelatinized starch, etc., is compressed on a standard tableting machine to form the pressed tablets of the invention. However, one of the advantages of the compositions of the invention is that, unlike many prior art compositions, a binder is not necessary in order to obtain firm nonfriable tablets. The tablets prepared by the invention are quite stable and surprisingly uniform in composition.

The tablets can optionally be coated with standard coatings such as sugar coatings, etc.

The invention will be more fully understood from the following example which is given for illustration purposes only and is not meant to limit the invention.

EXAMPLE

Preparation of the premix

The following ingredients are granulated with about 30 kg. of water, dried, and ground to give a powder having an average particle size of about 20 mesh:

| Ingredients: | Weight, kg. |
|---|---|
| Niacinamide | 22 |
| Ascorbic acid | 58 |
| Dicalcium phosphate, anhydrous | 85 |
| Cornstarch | 10 |

This premix is highly stable upon storage.

To the above premix the following ingredients are added, mixed well, and the resulting mixture compressed on a tableting machine into pressed tablets:

| Ingredients: | Weight, kg. |
|---|---|
| Vitamin $B_1$ mononitrate (fine) | 2.6 |
| Vitamin $B_2$ (ultrafine) | 2.2 |
| Vitamin $B_6$ hydrochloride | 2.2 |
| Vitamin $B_{12}$ (1:1000 dilution) | 2.5 |
| d-Calcium pantothenate | 3.8 |
| Vitamin A powder (500,000 units/gram) | 12.5 |
| Vitamin $D_2$ powder (850,000 units/gram) | 0.735 |
| Calcium stearate | 1.0 |

The resulting tablets are of good quality and stability and of excellent uniformity.

We claim:

1. A premix comprising from about 5 to about 20 percent niacinamide; from about 15 to about 55 percent of a compound selected from the group consisting of ascorbic acid, sodium ascorbate, and mixtures thereof; from about 20 to about 80 percent dicalcium phosphate; and from about 0.5 to about 25 percent cornstarch.

2. A premix comprising from about 10 to about 18 percent niacinamide; from about 20 to about 40 percent of a compound selected from the group consisting of ascorbic acid, sodium ascorbate and mixtures thereof; from about 20 to about 80 percent dicalcium phosphate; and from about 0.5 to about 10 percent cornstarch.

3. A multivitamin tablet comprising
   (a) from about 127 to about 200 mg. of a premix consisting essentially of from about 5 to about 20 percent niacinamide; from about 15 to about 55 percent of a compound selected from the group consisting of ascorbic acid, sodium ascorbate, and mixtures thereof; from about 20 to about 80 per cent dicalcium phosphate; from about 0.5 to about 25 percent cornstarch; and
   (b) from about 20 to about 40 mg. total of the following ingredients: vitamin A; vitamin $B_1$; vitamin $B_2$; vitamin $B_6$; vitamin $D_2$; vitamin $B_{12}$; a substance selected from the group consisting of pantothenic acid, panthenol, calcium pantothenate-calcium chloride complex, and dl-panthenol; and at least one pharmaceutical tableting lubricant.

4. A multivitamin tablet comprising
   (a) from about 175 to about 195 mg. of a premix consisting essentially of from about 10 to about 18 percent niacinamide; from about 20 to about 40 percent of a compound selected from the group consisting of ascorbic acid, sodium ascorbate, and mixtures thereof; from about 20 to about 80 percent dicalcium phosphate; from about 0.5 to about 10 percent cornstarch; and
   (b) from about 20 to about 40 mg. total of the following ingredients: from about 2 to about 20 mg. of a dry vitamin A powder, based on a potency of about 500,000 units/gram; from about 1 to about 5 mg. of vitamin $B_1$; from about 1 to about 5 mg. of vitamin $B_2$; from about 1 to about 5 mg. of vitamin $B_6$; from about 0.2 to about 1.5 mg. of a vitamin $D_2$ powder, based on a potency of about 850,000 units/gram; from about 0.5 to about 5 mcg. of vitamin $B_{12}$; from about 0.5 to about 10 mg. of a compound selected from a group consisting of pantothenic acid, panthenol, calcium pantothenate-calcium chloride complex, and dl-panthenol; and from about 0.5 to about 15 mg. of at least one lubricant selected from the group consisting of calcium stearate, stearic acid, cornstarch, magnesium stearate, talc, and a hydrogenated vegetable oil.

References Cited in the file of this patent

Fein: Modern Drug Encyclopedia, eighth edition, 1961, R. H. Donnelley Corp., New York, N.Y., page 1013.

Wood Tablet Manufacture, 1904, Lippincott Co. Phila., Pa., pages 40–42.